United States Patent [19]

Cox

[11] Patent Number: 5,577,926

[45] Date of Patent: Nov. 26, 1996

[54] PRESSURE EQUALIZATION ADAPTER FOR SUBSEA CABLE TERMINATION OR JUNCTION BOX

[75] Inventor: Steven C. Cox, Shenzhen, China

[73] Assignee: Texaco, Inc., White Plains, N.Y.

[21] Appl. No.: 349,579

[22] Filed: Dec. 5, 1994

[51] Int. Cl.[6] .................................................. H01R 4/64
[52] U.S. Cl. .................................. 439/204; 439/201
[58] Field of Search .................................. 439/204, 201, 439/199

[56] References Cited

U.S. PATENT DOCUMENTS 3,877,775  4/1975  Barlow ................................ 339/117 R
4,940,416  7/1990  Wagaman ............................... 439/204

Primary Examiner—David L. Pirlot
Assistant Examiner—Eugene G. Byrd
Attorney, Agent, or Firm—Kenneth R. Priem; James L. Bailey; William J. Beard

[57] ABSTRACT

A pressure balanced cable junction or termination box is provided for subsea use. A fluid tight hollow body member is filled with insulating fluid. A cable to be terminated enters one side of the cable termination device and is coupled to the box. A compressible fluid reservoir in contact with the external water pressure on one side transmits the pressure to the filling insulating fluid on the other side to provide pressure balancing.

8 Claims, 1 Drawing Sheet

PRESSURE EQUALIZATION ADAPTER FOR SUBSEA CABLE TERMINATION OR JUNCTION BOX

BACKGROUND OF THE INVENTION

This invention relates to cable junctions or terminations for subsea use as on offshore oil platforms or other subsea projects. More particularly, the invention relates to such junction or termination boxes which are configured to be pressure balanced internally with respect to a subsea environment at any subsea depth at which such cables are designed for use.

In the operation of offshore oil platforms it is often necessary to install electrical power or communication cables across or immersed in bodies of fresh, saline or salt water. Such cables are typically comprised of several jacketed conductors, filler layers between the conductors, an outer jacket layer and a protective armor layer for load bearing applied over the entire cable structure. When terminating such cables, or joining them, beneath the surfaces of the water it is common practice to use cable termination boxes or cable junction boxes to prevent water leakage into the internal cable structure at the termination or joint and to provide a load bearing structure coupled to the cable armor for handling the cable by lifting or placing machinery.

In the case of power cables in particular, water leakage to the cable interior can cause severe problems such as short circuits and the like. Previous attempts to seal, exteriorly to a cable junction box or termination box, all of the orifices and seams have often proved to be unsuccessful in preventing water intrusion when the cable junction or termination box is used in, say, 100 ft. of water or the like. At 100 ft. depth approximately three atmospheres of pressure exists in the water. Inside a cable box sealed at the surface an insulating fluid or air is present at one atmosphere of pressure. The lower pressure drop inside cable and the box can cause entry of water through faulty seals or by migration along the cables itself, either between the armor layer and the outside cable jacket, or in the cable interstices themselves if the filler material is permeable in nature as is the case in typical power cables.

BRIEF DESCRIPTION OF THE INVENTION

In the present invention a cable termination or junction box for subsea use is provided which is internally pressure balanced with its external environment. A cable junction or termination box is provided with a hollow body member and means for attaching an armored cable thereto to extend internally thereof. The junction box or termination box is typically filled with an insulating fluid such as Texaco Capella-B® oil, or the like, to exclude entry of water from the outside. In the present invention a pressure equalizer having a compressible bladder is placed in fluid communication with the interior of the box in sealed fashion, and also in intimate contact through external bleed ports with the water outside the box. Water pressure at any depth is then translated, via the compressible bladder, into internal fluid pressure within the box. Thus the interior pressure inside the box is always equalized with the exterior pressure outside the box, relieving the strain on box seals and the like and preventing the existence of a low pressure reservoir at a cable end or termination which could encourage water migration into the box along the cable structure itself.

The present invention is best understood by reference to the following detailed description thereof, when taken in conjunction with the accompanying drawings. It will be understood that the drawings are intended as illustrative only and not as limitative in nature.

DETAILED DESCRIPTION OF THE PREFERRED EMBODIMENT

Figure 1:
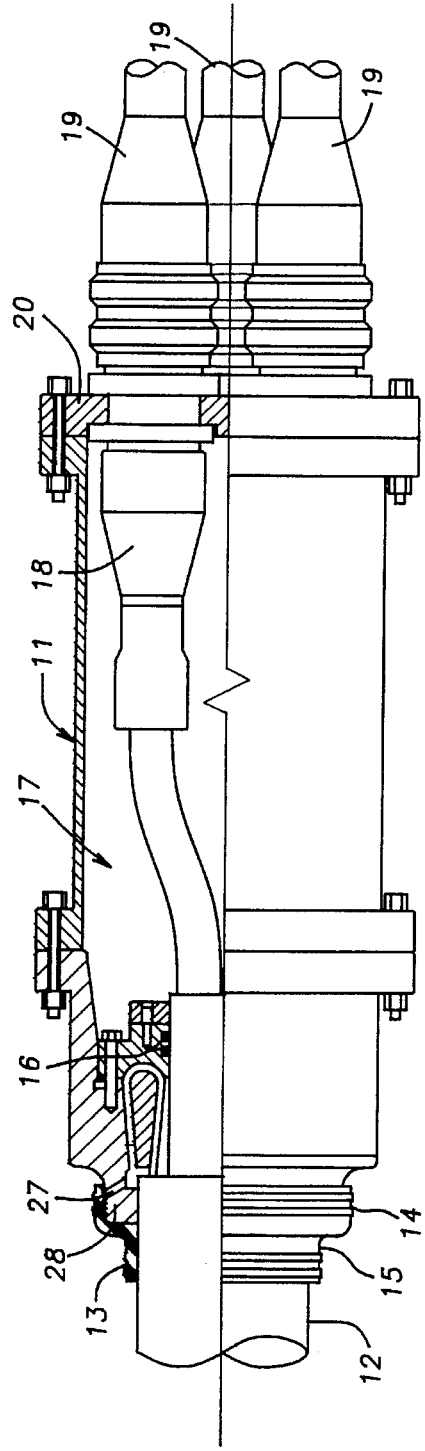
FIG. 1 is a schematic view, partially in section, showing a typical cable termination box as used in the prior art.
Figure 2:
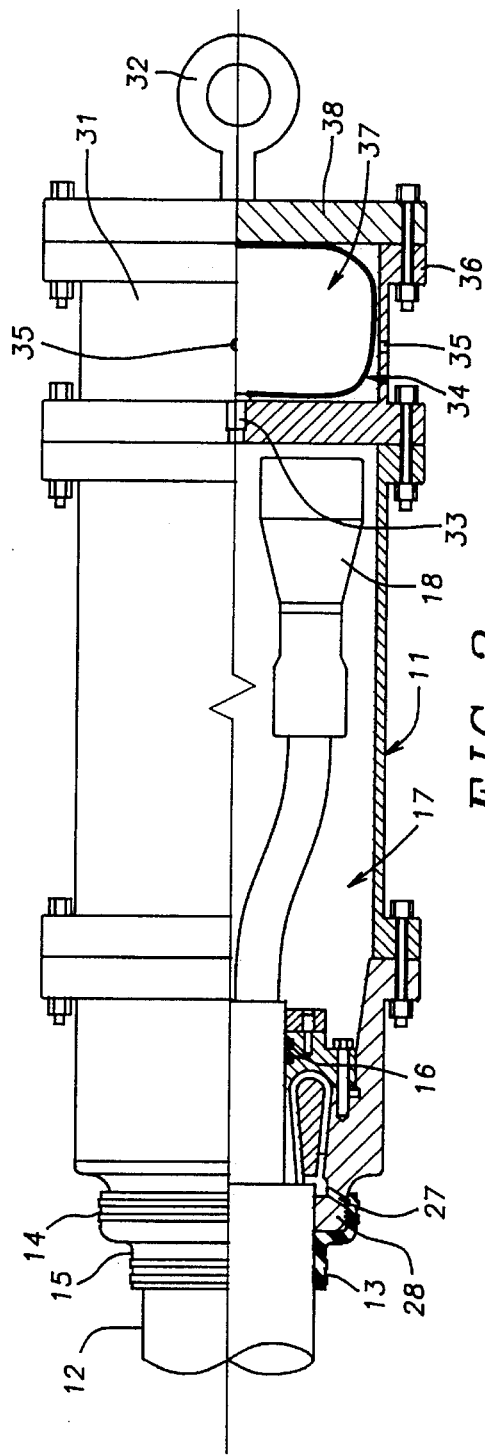
FIG. 2 is a schematic cross sectional view of an armored power cable such as used in conjunction with the present invention.
Figure 3:
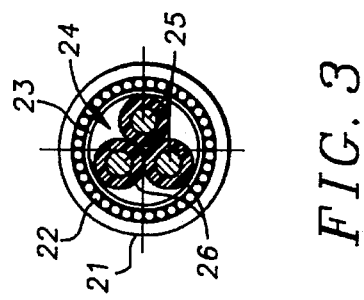
FIG. 3 is a schematic view, partially in section, showing a cable termination box according to the concepts of the present invention.

Referring initially to FIG. 1 and FIG. 2 a cable termination box as used in the prior art and a typical cable cross-section are shown schematically. While the drawings of FIGS. 1 and 3 are shown with respect to a cable termination box for subsea use, it will be understood by those of skill in the art that the invention would apply equally as well to a cable junction box for joining two or more cables in a subsea use.

In FIG. 1 a hollow body member 11 made of molded metal, plastic, or the like, is shown partially sectional; and is provided for terminating an armored cable 12 entering from the left side of the figure. As shown in the cross-sectional view of FIG. 2 the armored cable 12 comprises several layers. From the outside in there is an outer wrap 21 of flexible resilient elastomeric material such as rubber or polypropylene plastic extruded or wrapped over an armor wire layer 22. Wire layer 22 typically comprises a plurality of individual steel wires spirally wrapped over the inner cable core to protect the core and to serve as a load bearing strength member for the cable 12.

Three jacketed conductors 25 each having an extruded jacket 26 of rubber or plastic, as desired, are spirally wrapped about each other and the spaces (interstices) therebetween filled with an inert filler layer 24 such as jute or cotton rope spirally wrapped or the like. An inner wrap 23 layer of cloth tape, plastic tape or the like, overlies this core of inner conductors and filler to protect the core from the armor wire layer 22. A clamping connector member 14 is internally coupled to the outer armor layer 22 of cable 12 and relieves the tensile load strain on the cable 12 by means of a wedge shaped circular clamp 15 around which the individual strands of the armor layer 22 are bent and attached. An external rubber boot 13 seals the clamping connector member 14 and cable 12.

Interior cable core seals 16 comprising elastomeric O-rings, or the like, seal interiorly against the inner wrap layer 23 of cable 12. Also interiorly to the hollow body member 11 a fluid reservoir 17 is provided. A non-conducting fluid such as oil or the like fills the reservoir 17. If desired, as shown in FIG. 1, cable 12 conductors 25 may be terminated in pin connectors 18 of conventional design to couple signals across a bulkhead 20 to other exterior wire conductors 19 or the like. In the prior art configuration shown in FIG. 1, the insulating oil in fluid reservoir 17 is at atmospheric pressure and all attempts to exclude water are provided by seals 16, rubber boot 13 and elastomeric sealant 28 injected after assembly through sealant injection ports 27.

The use of such prior art termination boxes has led to leakage problems.

Although the cable cross-section of FIG. 2 is ideally shown as circular, in practice such cable cross-sections typically are irregular and varying in shape because of the compressibility of filler layers 24. It is very difficult to seal across such an irregular shape with a rubber boot 13 or an interior cable core seal 16 if a pressure drop exists from the cable/box exterior to its interior. Such a pressure drop acts as an engine or pump to propel water into interior of the box across the seal or even interiorly along the cable core if a defect or damage exists to the outer wrap and/or armor layers of the cable anywhere along its length.

Accordingly in the present invention a pressure equalizer 31 is attached to the body member 11. A protective housing member 36 is attached by bolts to body member 11. The housing 36 is provided with a cap 38 having a lifting eye 32 fixedly attached thereto for handling the terminated end of the cable 12. The housing 36 is also provided with external bleed ports 35 which communicate the external water pressure to its interior. Interior to the housing 36 is a compressible bladder 34 of rubber, plastic or other elastomeric material. Metallic bellows could also be used as a compressible bladder 34 if desired. The compressible bladder 34 is filled with the same insulating fluid or oil used in reservoir 17 in its fluid reservoir 37 and is in fluid communication with the fluid reservoir 17 of the body member 11 via an internal fluid bleed port 33. Thus external water pressure is directly coupled to the internal insulating fluid via external bleed ports 35, compressible bladder 34 and internal fluid bleed port 33.

In use the cable termination box of the invention can be disconnected from external cable connections 19 by unbolting bulkhead 20 and bolting on the protective housing assembly 36 with its internal compressible bladder 34 and fluid reservoir 37. Winches or hooks to cranes may then be connected to the lifting eye 32 for handling the terminated cable 12 as by lowering it into the water, etc. It will be understood that cable junction boxes provided with such protective housings, compressible bladders and internal insulating fluid reservoirs could similarly be provided, if desired. Only the geometry of cable terminations and attachments would differ without departing from the basic inventive concepts.

Changes and modifications within the true spirit and scope of the invention may be made apparent to those of skill in the art by the foregoing description. For example, the compressible bladder could be replaced with a piston and seal arrangement. A compressible bladder and housing could be configured differently and placed around the cable below the termination box or attached to a side of the termination box rather than the end. The aim of the appended claims is to cover all such changes and modifications as fall within the true spirit and scope of the invention.

I claim:

1. A pressure balanced adaptor for a cable termination box or a cable junction box for subsea use, comprising:

a fluid tight rigid hollow adaptor body member;

a means for attaching said adaptor body member, in a sealed fashion, to an armored multi-conductor cable connector having a hollow interior to communicate fluid pressure from said connector to the interior of said hollow adaptor body member;

an insulating fluid substantially filling the interior of said hollow adaptor body member and said connector interior; and a compressible fluid reservoir carried interiorly to said adaptor hollow body member in intimate contact with external water pressure on one or more of its exterior surfaces and with said insulating fluid filling the interior of said hollow interior of said connector on another of its surfaces and being capable of transmitting said external water pressure to said insulating fluid, thereby equalizing the pressure interior of said hollow interior of said connector and said adaptor body member when the two are attached to each other.

2. The adaptor of claim 1 wherein said means for attaching an armored cable connector to said body member comprises a friction coupling to the armor of said cable, a fluid tight boot seal over said friction coupling and a sealed bulkhead with a fluid bleed port therethrough.

3. The adaptor of claim 2 and further including means for lifting said cable and said termination or junction box for handling said cable.

4. The adaptor of claim 1 wherein said compressible fluid reservoir comprises a compressible bladder.

5. The adaptor of claim 4 wherein said compressible bladder comprises an elastomeric bladder.

6. The adaptor of claim 5 wherein said elastomeric bladder comprises a rubber bladder.

7. The adaptor of claim 1 wherein said compressible bladder comprises a flexible bellows.

8. The adaptor of claim 7 wherein said flexible bellows is metallic in construction.

* * * * *